United States Patent Office 3,133,029
Patented May 12, 1964

3,133,029
METHOD OF PREPARING A COPPER, COBALT
OR NICKEL CATALYST
James Hoekstra, Evergreen Park, Ill., assignor to
Universal Oil Products Company, Des Plaines, Ill.,
a corporation of Delaware
No Drawing. Filed Dec. 27, 1960, Ser. No. 78,339
4 Claims. (Cl. 252—466)

This invention relates to an improved method for the treatment of waste gas streams and more particularly to the use of an improved catalyst in treating and converting an exhaust stream prior to discharging it to the atmosphere.

The desirability, and importance, of removing certain components from automobile exhaust gases has recently been recognized. The unavoidably incomplete combustion of hydrocarbon fuels by the gasoline engine results in the generation of substantial quantities of unburned hydrocarbons, and undesirable products, which, as waste products, discharge into the atmosphere through the exhaust line. With the ever-increasing concentration of automobiles, particularly in urban areas, the discharge of deleterious matter into the atmosphere may reach significant proportions. These undesirable products are believed to react with atmospheric oxygen, under the influence of sunlight, to produce what is now commonly referred to as smog. The undesirable hydrocarbonaceous combustion products include, for example, unsaturated hydrocarbons, partially oxidized hydrocarbons, such as alcohols, ketones, aldehydes, and acids, etc., carbon monoxide, and various oxides of nitrogen and sulfur.

The discharge of exhaust gases from automotive engines is only one source of pollution within the atmosphere. Although described with particular reference to the conversion of such exhaust gases, the present invention is equally well adaptable to utilization with diesel engines, butane engines, natural gas engines, and the like. Other examples of the discharge of deleterious waste products into the atmosphere include the waste material from stationary units such as large internal combustion engines for driving pumps, compressors and generators and fluegas power recovery units, etc. The utilization of the present invention is advantageous in improving waste products characterized by the fumes exhausted from various industrial operations such as the printing industry, the tanning industry, and various chemical industries. For example, in the enameling and coating industry and in the printing industry, there are organic vapors from the coatings and inks, dyes, and the like, which contain hydrocarbons and other chemical compounds, which, either in the same or modified form, accumulate within the surroundings and are vented into the atmosphere by blowers, fans, etc. As an example of the chemical process and industry, to which the present invention may be successively adapted, is the process involved in the manufacture of phthalic anhydride. Thus, although particularly adaptable to the conversion of a hydrocarbon-containing combustible mixture emanating from an internal combustion engine, the present invention affords a novel method for improving a variety of waste products for the purpose of decreasing the deleterious effect that is otherwise enconuntered by discharging such waste products into the atmosphere.

Various types of catalyts have been found to be of advantage in converting exhaust streams, however, catalyst employing metal oxides as an activating component, which are other than the platinum group metals have been generally inferior to those catalysts which have used platinum or palladium as the catalytic agent. The metal oxide catalysts have generally been prepared by impregnating alumina particles as a base or supporting material with a solution of the metal nitrate, which is then decomposed by heating the mass at an elevated temperature. This method of preparation is now believed to encourage combination of the metal with the alumina, or where massive amounts of the metal salt are employed, the formation of a dense crystalline oxide. Neither the formation of the metal with the alumina nor the formation of dense forms of oxides are considered to favor high catalytic activity.

It is thus a principal object of the present invention to provide an improved oxidation catalyst by complexing with the catalyst base material a metal compound which will precipitate under mild conditions in order to preclude the formation of the undesired combination or of the dense oxide.

It is a further object of the invention to provide an improved catalyst which composites with the catalyst base a metal carbonate or a metal hydrous oxide which will readily precipitate the metal compound under mild conditions of low temperature drying so as to in turn permit the metal oxide to be formed by heating the impregnated material under high temperature calcination conditions.

In one embodiment the present invention provides a method for converting a waste gas stream to less harmful oxidized products which comprises subjecting such stream in the presence of air to contact with a catalyst comprising an alumina base impregnated with the solution of a metal compound that is selected from the group consisting of readily precipitable metal carbonate and metal oxides with the resulting impregnated base being subjected to mild heat and providing thereby a metallic compound composited therewith and then calcining the resulting dried base at an elevated temperature to provide a metal oxide composite with the alumina.

In a somewhat more specific embodiment, the present invention provides a process for converting to less harmful products which comprises subjecting the stream in the presence of air to contact with a catalyst comprising alumina and an oxide of iron group metal which is prepared by treating the alumina with a solution of the metal carbonate dissolved in a complexing agent in an amount forming a final catalyst having from about 2% to about 30% metal oxide by weight of the composite, drying the thus treated alumina at a temperature below about 400° F., and then calcining the dried and impregnated alumina to form an iron group metal oxide composited therewith.

Various types of complexing agents may be used to form the solution of the metal carbonate or metal hydrous oxide. For example, aqueous ammonia can be used to dissolve a metal carbonate and form a solution in which the alumina may be impregnated. After removal of excess solution forming an impregnated base material and effecting the drying thereof, the then impregnated material can be subjected to calcination at a high temperature to form the metal oxide as a composite with the alumina base material. Other complexing agents such as tartaric acid, citric acid, or ethylenediaminetetraacetic acid. Also, internally generated precipitating agents may be used to precipitate the hydrous oxide of a metal within a catalyst base material. For example, by impregnating the base with a solution of the metal salt and hexamethylene tetramine, subsequent heating will accelerate hydrolysis to release ammonia which will precipitate the hydrous oxide of the metal on the base material. The ammonium salt may then be removed by washing with water after which the catalyst may be dried and calcined.

The catalyst to be employed may be conveniently placed in a suitable container, or catalytic converter, and installed within the exhaust line. The catalytic converter may be of the through-flow, cross-flow, or radial-flow design, and, in the case of automotive exhaust gases, may either supplant, or be combined with, the usual acoustic muffler. In one embodiment, combustion air is injected ahead of the converter inlet, usually by an aspirator or some external compressive means. When used in other applications, the catalyst may be disposed as fixed bed in a suitable container or reaction zone, and the waste products together with air, are passed through the catalyst in either upward or downward flow. In another embodiment, the catalyst may be disposed in a fixed bed within the stack, or other outlet ducts, of a combustion chamber, and the combustion products passed, along with air, into contact with the catalyst prior to discharge into the atmosphere. A wide variety of factors affect the stability of active catalytic composites, which factors are generally peculiar to the environment in which the catalyst is employed. For example, an automotive internal combustion engine is commonly operated over a wide range of speed and load conditions, and, therefore, the combustion efficiency thereof is varied considerably; the space velocity and temperature of the exhaust gases, as well as the concentration of combustible material therein will likewise vary over wide limits. The catalyst should be capable of withstanding high temperatures of the order of 1600° F. to as high as 2000° F., and preferably should possess maximum activity at substantially lower temperatures. The catalyst should have a relatively low threshold-activation temperature in order that the conversion reactions are self-initiating, within a minimum time following the startup from relatively cold conditions. Thus, the catalyst must necessarily operate in a satisfactory manner at temperatures varying from about 200° F. to as high as 2000° F.

It is also a preferable feature of the present invention that the inorganic oxide carrier material be prepared with an apparent bulk density less than about 0.4 gram/cc. Low apparent bulk density may be obtained by controlled aging treatments after sphere formation, or by control of the aluminum to chloride ratio in the preparation of the alumina hydrosol prior to dropping and sphere formation. Generally, an aluminum to chloride weight ratio above about 1.3, when forming the hydrosol, will result in the desired low density spheres.

The various catalytically active metallic components which may be composited with the refractory inorganic oxide carrier material, may comprise, for example, vanadium, chromium, molybdenum, tungsten, members of the iron-group, copper, silver, gold and platinum-group metals of the periodic table. However, in accordance with the present invention, an improved method of catalyst preparation is provided herewith which is of greater advantage in connection with the non-platinum group metals. It is understood that the catalytic activity, thermal stability, lead stability, auto-initiating temperature, and other characteristics of the catalyst of the present invention, are not necessarily equivalent. Many of the specific catalytic composites discussed herein do not necessarily yield equivalent results when compared with the catalysts comprising two or more different metallic components.

In accordance with the present invention, the catalyst of this improved composite utilizes a special refractory inorganic oxide as the carrier material for the catalytically active metallic components hereinbefore set forth. Refractory inorganic oxides possess particular physical characteristics which readily permit adaption thereof to the environment encountered in the operation of a motor vehicle. For example, one desirable physical characteristic is that extremely high temperatures do not apparently affect the capability of the material to function as desired. The refractory inorganic oxide carrier material, for utilization in the catalyst of the present invention, may be manufactured by various suitable methods, including separate, successive, or co-precipitation methods of manufacture, however, a final reducing treatment is beneficially utilized, as will be hereinafter brought out more fully, to effect sustained activity for waste gas oxidation catalyst. It appears that a final reduction treatment in lieu of a calcination treatment gains better results in the use of the catalyst for oxidation reactions. For example, hydrogen, flue gas, and/or hydrocarbon vapors may be used as reducing agents. Also, the improved reduced refractory inorganic oxide materials of the present invention are preferably prepared such that they possess an apparent bulk density of less than about 0.4 gram/cc. Beneficial results are generally obtained through the use of a refractory inorganic oxide having an apparent bulk density within the range of about 0.15 to about 0.35 gram/cc.

The term "alumina" is intended to include porous aluminum oxide in the various states of the hydration. In addition to alumina, the improved carrier may incorporate at least one other refractory inorganic oxide in conjunction with the alumina. Specifically, an oxide such as silica, titania, zirconia, hafnia, or a mixture of two or more of such oxides may be incorporated with the alumina. The addition or incorporation of any of these refractory inorganic oxides, with the alumina, is generally dependent upon the desire to add thereto certain physical and/or chemical characteristics. The added oxide or oxides, may be present within the carrier material in an amount within the range of about 0.5% to about 20.0% by weight thereof. Intermediate quantities are preferred, and will be normally within the range of about 1.0% to about 10.0% by weight. The additional oxide, or oxides, may be effectively incorporated with the alumina by adding a water soluble salt of the component into the solution from which the alumina is precipitated. For example, titanium tetrachloride or zirconyl chloride may be added to the alumina sol prior to its dropping from the tips in the preparation of alumina spheres. However, the particular method employed for the manufacture of the alumina and other refractory material composited therewith, is not considered an essential feature of the present invention.

The catalyst may take the form of any desired shape, such as spheres, pills, extrudates, powder, granules, cakes, etc. The preferred form of support is the sphere, and spheres of the improved carrier by this invention may be continuously manufactured by the well-known oil drop method, following the procedure described in U.S. Patent No. 2,620,314, issued to James Hoekstra. Regardless of the method of manufacturing the refractory inorganic oxide particles, such particles are generally subjected to specific aging treatments. In one embodiment, the low apparent bulk density refractory material of the present invention may be prepared by effecting such aging treatments under sufficient pressure to maintain water in a liquid phase, while aging under a temperature level in excess of about 210° F.

An acidic oxide, such as titania or zirconia, compounded with the alumina normally imparts some acidic properties to the catalytic support, however, where desired, a halogen or phosphorus, may be combined with the composite support to provide a further acidic constituent, and may be added in any suitable manner, either before or after the incorporation of the catalytically active metallic component to the support. The addition of halogen is generally accomplished through the use of an acid such as hydrogen fluoride and/or hydrogen chloride, or volatile salts such as ammonium fluoride and/or ammonium chloride. The halogen may be incorporated into the alumina during the preparation of the latter, as where the refractory inorganic oxide is prepared from a halide-containing hydrosol. Such a method affords a convenient manner of compositing halogen while at the same time manufacturing the alumina. In still another method of manufacture, the halogen may be composited with the refractory oxide during the impregnation thereof with the catalytically active metallic components. Thus, where the low density alumina is prepared from an alumina hydrosol having an aluminum to chloride weight ratio in excess of 1.3, the use of such method readily incorporates chloride, where the latter is desired as the halogen. Phosphorus may be incorporated with the composite by the use of a phosphate or acid phosphate salt, such as phosphoric acid, suitably composited with the refractory carrier.

Regardless of the particular refractory materials employed for the metallic component, and regardless of the particular method selected for the preparation of such carrier, the catalytically active metallic component may be added thereto in any suitable, convenient manner.

In using catalytic agents other than the platinum group of metals as the activating components of the final catalyst, it is generally preferable to have the active metal component present in the composite within the range of from about 1.0% to 30.0%, and generally within the somewhat narrower range of from about 2.0% to about 20.0%. Copper compounds or the Group I-B compounds in the periodic table, as well as metals from Groups 5, 6, 7, and 8 are an advantage in forming catalyst components, especially catalyst components of the iron group metals, and particularly iron, cobalt and nickel. Accordingly, composites may be made of more than one activating component such as cupric oxide, iron oxide, cobalt-nickel-cupric oxide-iron oxide, cobalt oxide, cupric-iron oxide and nickel, cupric-cobalt and nickel. Illustrative catalyst composites using one or more components from Groups 5, 6, 7 and 8 in the periodic table include by way of example and not by way of limitation, cupric oxide-vanadium oxide, cupric oxide-molybdenum oxide, cupric oxide-tungsten oxide, cupric oxide-uranium oxide, cupric oxide-manganese oxide, cupric oxide-platinum oxide, cupric oxide-palladium oxide, etc., and combinations containing two or more additional catalyst components including, for example, cupric oxide-chromium oxide-platinum oxide, cupric oxide-chromium oxide-palladium oxide, cupric oxide-chromium oxide-platinum oxide, cupric oxide-tungsten oxide-platinum oxide, cupric oxide-tungsten oxide-palladium oxide, cupric oxide-tungsten oxide-platinum oxide-palladium oxide, cupric oxide-manganese oxide-platinum oxide, cupric oxide-manganese oxide-palladium oxide, cupric oxide-manganese oxide-platinum oxide palladium oxide, cupric oxide-iron oxide-platinum oxide, cupric oxide-iron ovide-palladium oxide, cupric oxide-iron oxide-platinum oxide-palladium oxide, cupric oxide-cobalt oxide-platinum oxide, cupric oxide-cobalt oxide-palladium oxide, cupric oxide-cobalt oxide-platinum oxide-palladium oxide, cupric oxide-nickel oxide-platinum oxide, cupric oxide-nickel oxide-palladium oxide, cupric oxide-nickel oxide-platinum oxide-palladium oxide, cupric oxide-cobalt oxide-nickel oxide, cupric oxide-cobalt-palladium oxide, etc.

The following examples are given for the sole purpose of further illustrating the value of the present invention, and to indicate the benefits afforded through the utilization of a modified form of complexing an activating component with the base material. It is not intended that the present invention to be limited to the specific reagents, catalyst, concentrations and/or conditions employed within the examples.

The catalytic composites were evaluated by means of a particular test which is designed to simulate actual driving conditions. The test procedure involves the utilization of a standard dynamometer, in which an 8-cylinder gasoline engine is loaded, or driven, by a motor generator. Approximately 550 cc. of each of the catalyst portions are individually evaluated by being placed within a cylindrical vessel, or converter, having an inside diameter of about 4 inches, and the entire apparatus is serially connected into the engine exhaust line. Thus, the catalyst is placed within the converter on a supporting screen, and to a bed height of about 3 inches. A second screen is placed above the catalyst bed for the purpose of separating the catalyst from ¼-inch ceramic balls employed to facilitate the even distribution of the exhaust gases flowing downwardly through the apparatus. Combustion air is pressured into the converter inlet, and its flow rate adjusted such that the average temperature of the catalyst bed is maintained within the range of about 800° F. to about 1600° F. In order to facilitate the comparison of the catalytic evaluation procedures, it is preferred that the flow rate of combustion air be held constant at about six pounds per hour, such that the catalyst bed temperature is maintained at a level of about 900° F. The fuel employed in the test procedure is a commercial, premium grade gasoline containing 3 cubic centimeters of tetraethyl lead per gallon including about 0.1% sulfur and 2 p.p.m. of phosphorus. Since the concentration of unburned hydrocarbons, and undesirable products, within the exhaust gases, as well as the throughput thereof, varies in accordance with the physical status of the engine—that is, whether idling, accelerating, cruising, or decelerating—the test procedure is still further facilitated by providing for a constant load throughout the entire test period. Samples of the converter inlet and outlet gases are taken at various intervals during the test procedure. These samples were analyzed for hydrocarbons by a Liston-Becker infra-red ABE detector. As employed in reporting the results of the analyses performed on the effluent of the catalytic converter, the term "hydrocarbon" connotes all hydrocarbons, whether saturated, unsaturated, or partially oxidized, as hereinbefore set forth. The carbon monoxide concentration, within the exhaust gases, is determined by accurate gas chromatographic techniques. The internal combustion engine is operated for a total period of 40 hours, during which time 300 pounds of premium grade fuel are passed therethrough; provisions are made whereby the fuel is consumed at a constant rate of about 7.5 pounds per hour. Samples of the inlet and outlet converter gases are taken at various intervals of time, and analyzed for carbon monoxide and hydrocarbons as outlined above.

An inherent result of the small volume of catalyst employed in each evaluation procedure, is that the space velocity of the exhaust gases coming into contact with the catalyst is considerably higher than would usually be encountered under normal driving conditions. Accordingly, the percentage conversions obtained during actual use in automobile exhaust mufflers, would be considerably higher.

*Example I*

A catalyst, designated as "A," was prepared by impregnating alumina spheres, which had in turn been prepared by dissolving aluminum pellets in hydrochloric acid to form a sol, and the resultant sol treated in a manner similar to procedure set forth in U.S. Patent No. 2,620,-314, including the steps of mixing hexamethylene-tetramine therewith and dropping it into an oil bath to form the spheres. In this instance, when forming the sol, the aluminum to chloride weight ratio was controlled to be above 1.3 so as to give desired low density spheres. Formed spheres were aged in oil and therein an aqueous solution of ammonia, subsequently being washed and dried and calcined at about 1000° F. A portion of the aluminum oxide spheres were then treated with a solution of copper nitrate to provide a 20% cupric oxide complex therewith, by weight, after evaporation to dryness and high temperature calcination at about 1000° F. for about two hours in a muffle furnace. Two fifteen minute impregnations were used, with drying and calcination being effected after each impregnation.

Another catalyst, designated as "B," was prepared on the same type of alumina sphere base by impregnating the base material with a solution of copper carbonate dissolved in aqueous ammonia providing a resulting 20% cupric oxide, by weight, complex with the alumina. The spheres were impregnated twice with the copper-ammonia complex solution, being dried after a first fifteen minute impregnation with an infra-red lamp and calcined for two hours at about 850° F., then reimpregnated, redried and recalcined at the same conditions.

A 550 cc. sample of catalyst "A" and a 550 cc. sample of catalyst "B" were subjected to a forty hour evaluation as described hereinbefore. The results showed that catalyst "A" provided 31.5% conversion of hydrocarbons after the forty hours, and a carbon monoxide conversion of 35% after the forty hours; while catalyst "B" converted 42.5% of the hydrocarbons and 46% of the carbon monoxide after the forty hour period. Thus, it may be seen that the carbonate impregnation procedure provided an improved catalyst for the oxidation of exhaust gases.

*Example II*

Another catalyst, similar to "B" may be prepared by impregnating alumina spheres of the type heretofore described, with a solution of copper nitrate dissolved in a slightly acidified hexamethylene tetramine solution. A batch of the alumina spheres are soaked in the solution for a period of time providing a resulting 20% cupric oxide composition, by weight, following heating, washing, drying and calcination. The heating of the soaked spheres accelerates hydrolysis of the hexamethylene tetramine solution to release ammonia and precipitate the hydrous copper oxide. The ammonium salt is removed from the spheres by water washing and the resulting washed spheres with the hydrous copper oxide are then subjected to drying and calcination of at about 900° to 1000° F., for a two hour period.

Testing a 550 cc. sample of the alumina-copper oxide complex catalyst for evaluation as an oxidation catalyst will find that the catalyst is active for oxidizing both hydrocarbons and carbon monoxide in an exhaust gas stream.

*Example III*

Still another catalyst may be prepared by impregnating alumina spheres of the type heretofore described with a solution of nickel chloride to which an excess of ammonia has been added to redissolve the nickel hydroxide, first precipitated. A batch of alumina spheres are soaked in the solution for a period of time providing a resulting 15% nickel oxide composition following heating, washing, drying, and calcination. The heating of the soaked spheres dries off the excess ammonia which has complexed the nickel hydroxide, thus reprecipitating the latter. The ammonium salt is removed by washing, and the washed spheres with the hydrous nickel oxide are then subjected to drying and calcination in the manner set forth in Example I.

The testing of a 550 cc. sample of the alumina-nickel oxide complex catalyst for evaluation as an oxidation catalyst will find that the catalyst is active for oxidizing both hydrocarbons and carbon monoxide in an exhaust gas stream.

I claim as my invention:

1. A method for producing a catalyst which comprises commingling aqueous ammonia and a carbonate of a metal selected from the group consisting of copper, cobalt and nickel, impregnating an alumina base with the resultant mixture, drying the impregnated base to composite with the base a compound of said metal, and then calcining the dried base to form a composite of alumina and an oxide of said metal.

2. The method of claim 1 further characterized in that said metal is copper.

3. The method of claim 1 further characterized in that said alumina base has a bulk density of less than about 0.4 gram per cubic centimeter.

4. A method for producing a catalyst which comprises commingling aqueous ammonia and copper carbonate, impregnating an alumina base with the resultant mixture in an amount to form a final catalyst containing about 2% to 30% by weight of cupric oxide, drying the impregnated alumina, and then calcining the dried impregnated alumina to form a composite of alumina and cupric oxide.

References Cited in the file of this patent

UNITED STATES PATENTS

| | | |
|---|---|---|
| 2,330,089 | Bond | Jan. 4, 1944 |
| 2,733,839 | Stover et al. | Dec. 11, 1956 |
| 2,927,088 | Michalko et al. | Mar. 1, 1960 |
| 3,024,593 | Houdry | Mar. 13, 1962 |

FOREIGN PATENTS

| | | |
|---|---|---|
| 797,777 | Great Britain | July 9, 1958 |